United States Patent [19]

Kayane et al.

[11] Patent Number: 4,618,671
[45] Date of Patent: Oct. 21, 1986

[54] 4-METHYL-PYRIDONE MONOAZO COMPOUND HAVING BOTH MONOCHLOROTRIAZINYL AND VINYLSULFONE TYPE FIBER-REACTIVE GROUPS

[75] Inventors: Yutaka Kayane, Ibaraki; Tetsuya Miyamoto, Takatsuki; Takashi Omura, Ashiya; Hirokazu Sawamoto, Minoo; Naoki Harada, Ibaraki; Akira Takeshita, Toyonaka, all of Japan

[73] Assignee: Sumitomo Chemical Company, Limited, Osaka, Japan

[21] Appl. No.: 682,241

[22] Filed: Dec. 17, 1984

[30] Foreign Application Priority Data

Jul. 31, 1984 [JP] Japan ................... 59-162740

[51] Int. Cl.$^4$ .................... C09B 62/085; C09B 62/53; D06P 1/382; D06P 3/66
[52] U.S. Cl. .................. 534/635; 534/582; 534/598; 534/617; 534/641
[58] Field of Search .............. 534/635, 617, 641, 6

[56] References Cited

U.S. PATENT DOCUMENTS 4,515,598  5/1985  Meininger et al. ........... 534/617 X

FOREIGN PATENT DOCUMENTS

| 0078009 | 5/1983 | European Pat. Off. | ............ 534/635 |
| 0080352 | 6/1983 | European Pat. Off. | ............ 534/635 |
| 0105027 | 4/1984 | European Pat. Off. | ............ 534/635 |
| 57-161174 | 10/1982 | Japan | ................... 534/635 |
| 58-168660 | 10/1983 | Japan | ................... 534/635 |
| 59-157158 | 9/1984 | Japan | ................... 534/635 |
| 59-168066 | 9/1984 | Japan | ................... 534/635 |
| 59-174651 | 10/1984 | Japan | ................... 534/635 |

OTHER PUBLICATIONS

Chem. Abstracts, 95, 8 (Aug. 1981), p. 73, No. 63672c.
Chem. Abstracts, 96, 22 (May 1982), p. 88, No. 182736g.
Chem. Abstracts, 98, 18 (1983), p. 87, No. 145030t.

Primary Examiner—Floyd D. Higel
Attorney, Agent, or Firm—Stevens, Davis, Miller & Mosher

[57] ABSTRACT

A pyridone compound of the following formula, or a salt thereof,

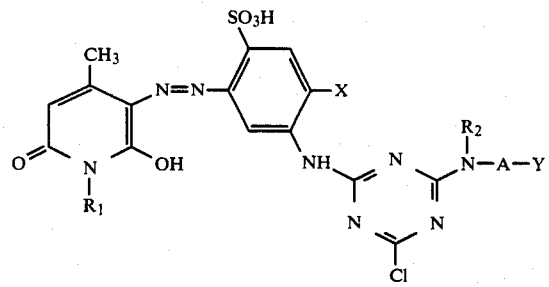

wherein $R_1$ and $R_2$ are independently a hydrogen atom or a lower alkyl group having up to 4 carbon atoms, X is a hydrogen atom or a methyl or sulfo group, A is an unsubstituted or substituted phenylene or naphthylene group, and Y is $-SO_2CH=CH_2$ or $-SO_2CH_2CH_2Z$, in which Z is a group capable of being split by the action of an alkali. The compound is useful for dyeing or printing fiber materials to give a dyed product of a brilliant yellow color excellent in various fastness properties with good reproducibility.

6 Claims, No Drawings

4-METHYL-PYRIDONE MONOAZO COMPOUND HAVING BOTH MONOCHLOROTRIAZINYL AND VINYLSULFONE TYPE FIBER-REACTIVE GROUPS

The present invention relates to a monoazo pyridone compound, a process for producing the same and dyeing or printing of fiber materials using the same.

As well known, there are great numbers of so-called reactive dyes useful for dyeing or printing fiber materials. Of these, reactive dyes having both monohalotriazinyl and vinylsulfone type fiber reactive groups are known to have excellent dye performances. Nowadays, however, it is eagerly desired to find reactive dyes of this kind having more excellent dye performances such as high solubility in water and an aqueous alkaline solution, excellent build-up, level-dyeing and wash-off properties, and high exhaustion and fixation percentages, and being able to give a dyed or printed product of a deep color having excellent fastness properties.

The present inventors have undertaken extensive studies, and as a result, have found a specific pyridone compound which can exhibit excellent dye performances and is advantageous from the industrial point of view.

The present invention provides a pyridone compound of the following formula (I), or a salt thereof,

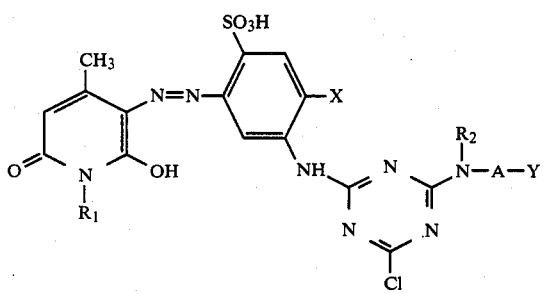
(I)

wherein $R_1$ and $R_2$ are independently a hydrogen atom or a lower alkyl group having up to 4 carbon atoms, X is a hydrogen atom or a methyl or sulfo group, A is an unsubstituted or substituted phenylene or naphthylene group, and Y is $-SO_2CH=CH_2$ or $-SO_2CH_2CH_2Z$, in which Z is group capable of being split by the action of an alkali, and also provides a process for producing the pyridone compound of the formula (I), which comprises (1) reacting a m-phenylenediamine sulfonic acid of the folowing formula (II),

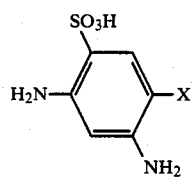
(II)

wherein X is as defined above, and an amine of the following formula (III),

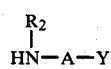
(III)

wherein A, Y and $R_2$ are as defined above, with cyanuric chloride in an optional order to obtain a compound of the following formula (IV),

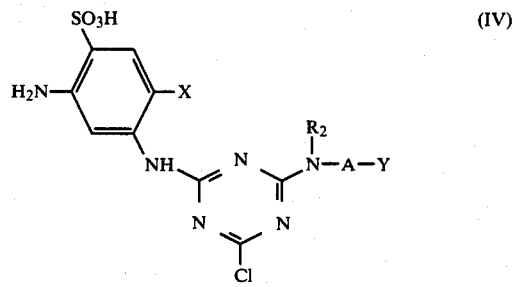
(IV)

wherein A, X, Y and $R_2$ are as defined above, diazotizing the compound of the formula (IV), and then coupling the resulting diazonium salt with a pyridone of the following formula (V),

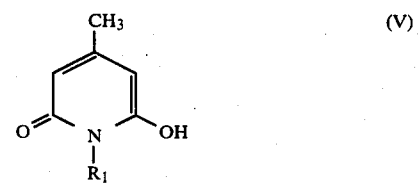
(V)

wherein $R_1$ is as defined above, or (2) condensing the m-phenylenediamine sulfonic acid of the formula (II) with cyanuric chloride, diazotizing the resulting condensate, coupling the resulting diazonium salt with the pyridone of the formula (V) to obtain a dichlorotriazinyl compound of the following formula (VI),

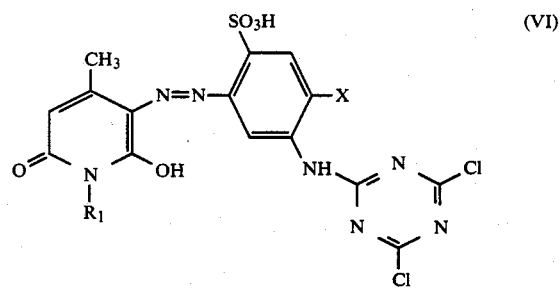
(VI)

wherein X and $R_1$ are as defined above, and then condensing the dichlorotriazinyl compound of the formula (VI) with the amine of the formula (III).

In the above forumula (I), examples of the lower alkyl group represented by $R_1$ and $R_2$ are methyl, ethyl, n-propyl, isopropyl, n-butyl and isobutyl groups. Of these, preferred are methyl and ethyl groups. Preferred X is a sulfo group. Examples of the group Z capable of being split by the action of an alkali are a sulfuric acid ester, thiosulfuric acid ester, phosphoric acid ester, acetic acid ester groups and a halogen atom. Among the phenylene or naphthylene groups represented by A, preferred are a phenylene group unsubstituted or substituted with one or two substituents selected from chlorine and bromine atoms and methyl, ethyl, methoxy, ethoxy and sulfo groups, and a naphthylene group unsubstituted or substituted with one sulfo group. Examples thereof are as follows.

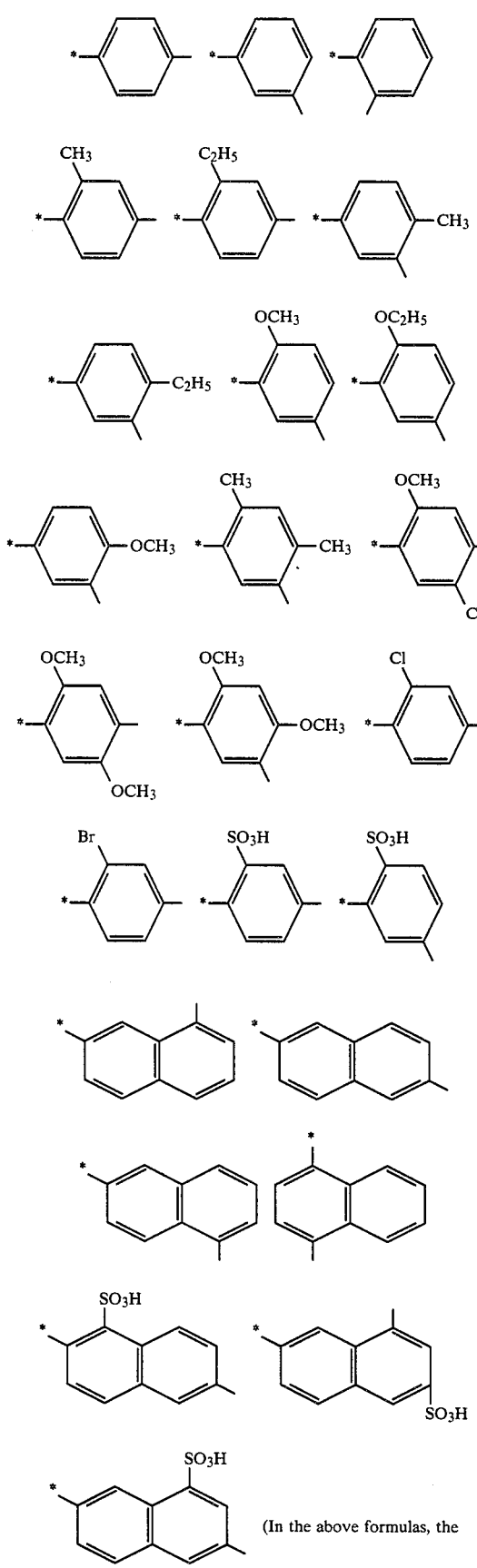

(In the above formulas, the asterisked linkage is bonded to the group $-\overset{R_2}{\underset{|}{N}}-$.)

Among the pyridone compounds represented by the formula (I), preferable is the one having a lower alkyl group as $R_1$ and a sulfo group as X. More preferable is the one having a lower alkyl group as $R_1$, a sulfo group as X and an unsubstituted or substituted phenylene group as A.

In the production of the pyridone compound represented by the formula (I), the m-phenylenediamine sulfonic acid of the formula (II) and the amine of the formula (III) are subjected to condensation with cyanuric chloride in an optional order. A first condensation of any one of the m-phenylenediamine sulfonic acid (II) or the amine (III) with cyanuric chloride can be carried out at a temperature ranging from 0° C. to 30° C., while controlling the pH within a range of from 2 to 8. A second condensation of the resulting condensate with the remaining one of (III) or (II) can be carried out at a temperature ranging from 20° C. to 60° C. while controlling the pH within a range of from 4 to 7, thus obtaining the compound of the formula (IV). The compound (IV) is diazotized in a manner well known in the art, and then coupled with the pyridone of the formula (V). The coupling can be carried out at a temperature ranging from 0° to 30° C., while controlling the pH within a range of 4 to 8. Thus, the pyridone compound of the formula (I), or a salt thereof, can be obtained.

Alternatively, the m-phenylenediamine sulfonic acid of the formula (II) is subjected to condensation with cyanuric chloride. The condensation can be carried out in an aqueous medium at a temperature ranging from 0° to 30° C. while controlling the pH within a range of from 2 to 8. The condensate thus obtained is diazotized in a manner well known in the art, and then coupled with the pyridone of the formula (V). The coupling can be carried out at a temperature ranging from 0° to 20° C. while controlling the pH within a range of from 4 to 8. The resulting dichlorotriazinyl compound of the formula (VI) is then subjected to condensation with the amine of the formula (III). The condensation can be carried out at a temperature ranging from 20° to 60° C. while controlling the pH within a range of from 4 to 7. Thus, the pyridone compound of the formula (I), or a salt thereof can be also obtained.

The pyridone compound of the formula (I) thus obtained may be in the form of a free acid or a salt, preferably alkali metal or alkaline earth metal salt. Particularly preferred are sodium, potassium and lithium salts.

The pyridone compound (I) produced in accordance with the present invention may be in a liquid form obtained by removing inorganic salts or adding a dyeing improver, if necessary, after completion of the reaction, or may be formed into a powdery product by subjecting the above liquid or the reaction mixture as such to evaporation i.e. spray-drying and the like, or into either liquid or powdery product through salting out of the desired compound in a conventional manner using an electrolyte.

The pyridone compound (I) having two kinds of fiber reactive groups may be used as a reactive dye for dyeing hydroxyl group-, or amide group-containing materials.

The hydroxyl group-containing materials include natural or synthetic hydroxyl group-containing fiber materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane.

Examples of the materials, particularly in the fibers forms, are wool and other animal furs, silk, leather, polyamide-6,6 polyamide-6, polyamide-11 and polyamide-4.

The dyeing may be carried out in a manner suitable for the reactive groups appended to the fiber-reactive dye.

For example, in the case of dyeing cellulose fiber materials, the dyeing may be carried out by an exhaustion dyeing, printing, padding including cold-pad-batch-up method or the like, from which a suitable one may be chosen depending on the physical and chemical properties of the fiber materials.

More concretely speaking, the exhaustion dyeing may be carried out at a relatively low temperature using a dye bath containing an acid binding agent and if desired, a neutral salt such as sodium sulfate and sodium chloride, and additives such as dissolution assistants, penetrants and level dyeing agents. The neutral salt capable of promoting the exhaustion of the compound into the fiber materials may be added after or/and before the temperature of the dye bath reaches a desired level for the dyeing.

The padding may be carried out by applying a padding solution to the fiber material at ambient or elevated temperatures, drying the materials padded and then steaming or dry-heating the same to effect the fixation.

The printing may be carried out in a one-phase manner wherein the fiber materials may be printed with a printing paste containing an acid binding agent, followed by steaming at a temperature of 100° to 160° C., or a two-phase manner wherein the fiber materials may be printed with a neutral or weakly acidic printing paste, followed by passing through a hot alkaline bath containing an electrolyte, or over-padding with an alkaline padding solution containing an electrolyte, and then subject the material to steaming or dry-heating. The printing paste may be prepared in a conventional manner using a thickener such as sodium alginate and starch ether and an emulsifier, if desired, along with conventional printing assistants such as urea, dispersing agents and the like.

The acid binding agent useful for fixing the pyridone compound (I) to the cellulose fiber materials includes water-soluble basic salts such as alkali or alkaline earth metal salts of inorganic or organic acids and compounds capable of liberating alkalis under heating conditions. Preferred are alkali metal hydroxides and alkali metal salts of inorganic or organic acids having a weak or medium strength. Particularly preferred are sodium and potassium salts. Examples thereof are sodium hydroxide, potassium hydroxide, sodium hydrogencarbonate, sodium carbonate, sodium formate, potassium carbonate, mono, di or trisodium phosphate, sodium silicate, sodium trichloroacetate and the like.

In dyeing the amide group-containing fiber materials, the fiber materials may be dipped into a dye bath under acid or weak acid conditions to effect the exhaustion and then the bath may be made alkaline to effect the fixation. The dyeing may be carried out usually at a temperature of 60° to 120° C. In order to obtain a level-dyed product, there may be incorporated into the dye bath a level dyeing agent such as a condensation product of cyanuric chloride and 3 mole times of aminobenzenesulfonic acid or aminonaphthalenesulfonic acid, or an addition product of stearylamine and ethylene oxide.

The pyridone compound of the present invention can give remarkable advantages in the dyeing or printing fiber materials. Particularly when used for dyeing or printing cellulose fiber materials, the present compound can exhibit excellent build-up, level-dyeing and washing-off properties along with high exhaustion and fixation percentages, and give a dyed or printed product excellent in light fastness, perspiration-light fastness, wet fastness such as washing resistance, peroxide-washing resistance, chlorine-containing water resistance, chlorine-bleaching resistance, perspiration resistance, acid-hydrolysis resistance and alkali resistance, and abrasion fastness and iron fastness.

Moreover, the pyridone compound of the present invention can exhibit a high solubility and give a dyed or printed product constant in quality irrespective of change in the dyeing temperature or bath ratio.

The present invention is illustrated in more detail with reference to the following Examples, which are only illustrative of the present invention. In the Examples, parts and % are by weight, unless otherwise specified.

EXAMPLE 1

1,3-Phenylenediamine-4,6-disulfonic acid (26.8 parts) was added into water (300 parts), and dissolved by addition of a 30% aqueous sodium hydroxide solution to adjust the pH to 6. After cooling the solution to a temperature of between 0° and 10° C., cyanuric chloride (18.4 parts) was added thereto. The mixture was stirred for 2 hours at a temperature of between 0° and 10° C., while controlling the pH within a range of from 5 to 6 using a 20% aqueous sodium carbonate solution. Successively, 1-aminobenzene-3-β-sulfatoethylsulfone (28 parts) was added to the reaction mixture, and the resulting mixture was stirred for 2 hours at a temperature of between 20° and 30° C., while controlling the pH within a range of from 5 to 6 using a 20% aqueous sodium carbonate solution. To this reaction mixture was added sodium nitrite (6.9 parts), and the mixture was dropwise added to a 10% aqueous hydrochloric acid solution (110 parts) kept at a temperature of between 0° and 5° C. over 1 hour. The resulting mixture was stirred for an additional 1 hour at a temperature of between 0° and 5° C., and then any excess nitrous acid existing therein was decomposed with sulfamic acid. The resulting diazonium salt solution was dropwise added to a suspension of 1-ethyl-4-methyl-6-hydroxy-2-pyridone (15.3 parts) in water (200 parts) at a temperature of between 0° and 10° C. over 1 hour, while controlling the pH within a range of from 6 to 7 using a 20% aqueous sodium carbonate solution. The mixture was stirred for 1 hour at that temperature, and then sodium chloride (80 parts) was added thereto. Crystals precipitated were collected on a filter and dried at 60° C. to obtain a pyridone compound of the following formula.

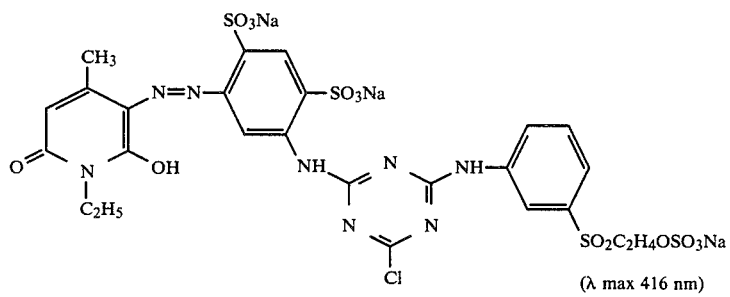

(λ max 416 nm)

EXAMPLE 2

1,3-Phenylenediamine-4,6-disulfonic acid (26.8 parts) was added into water (300 parts), and dissolved by the addition of a 30% sodium hydroxide solution to adjust the pH to between 6 and 7. After cooling the solution to a temperature of between 0° to 10° C., cyanuric chloride (18.4 parts) was added thereto. The mixture ws stirred for 2 hours at a temperature of between 0° and 10° C., while controlling the pH within a range of from 6 to 7 using a 20% aqueous sodium carbonate solution. Successively, sodium nitrite (6.9 parts) was added thereto, and the mixture was dropwise added over 1 hour to a 10% aqueous hydrochloric acid solution kept at a temperature of between 0° and 5° C., and then the resulting mixture was stirred for 1 hour at a temperature of between 0° to 5° C. Excess nitrous acid was decomposed with sulfamic acid, and the obtained diazonium salt solution was dropwise added to a suspension of 1-ethyl-4-methyl-6-hydroxy-2-pyridone (15.3 parts) in water (200 parts) at a temperature of between 0° and 5° C. over hour, while controlling the pH within a range of from 6 to 7 using a 20% aqueous sodium carbonate solution, and the mixture was stirred for 1 hour at that temperature. Thereafter, 1-aminobenzene-4-β-sulfatoethylsulfone (28 parts) was added thereto, and the mixture was heated to a temperature of between 30° to 40° C., while controlling the pH within a range of from 5 to 6 using a 20% aqueous sodium carbonate solution. The reaction mixture was stirred for an additional 3hours at that temperature, and then mixed with sodium chloride (150 parts). Crystals precipitated were collected on a filter, and then dried at 60° C. to obtain a pyridone compound of the following formula.

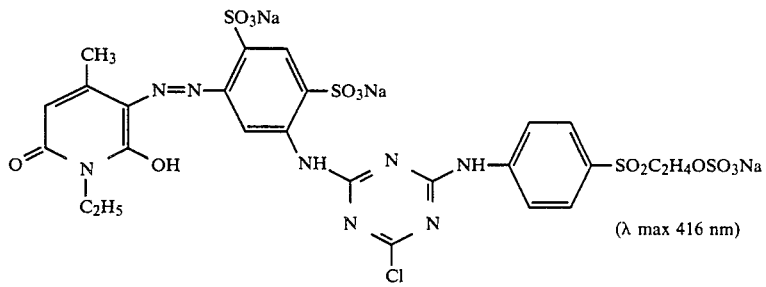

(λ max 416 nm)

EXAMPLES 3 TO 20

Example 1 was repeated, except that the 1-aminobenzene-3-β-sulfatoethylsulfone and the 1-ethyl-4-methyl-6-hydroxy-2-pyridone used in Example 1 were replaced by each compound of the formulas (III) and (V) shown in the following table, respectively. Thus, each corresponding pyridone compound was obtained.

| Example No. | Formula (III)<br>$H_2N-A-Y$ | Formula (V)<br>(pyridone with $CH_3$, OH, R) | Color on cotton |
|---|---|---|---|
| 3 | $H_2N$-phenyl($OCH_3$)-$SO_2C_2H_4OSO_3H$ | 1-ethyl-4-methyl-6-hydroxy-2-pyridone | Greenish yellow |

-continued

| Example No. | Formula (III) H₂N—A—Y | Formula (V) <br> 4-methyl-6-hydroxy-1-R-pyridin-2-one | Color on cotton |
|---|---|---|---|
| 4 | 3-H₂N-C₆H₄-SO₂CH=CH₂ | R = C₂H₅ | " |
| 5 | 4-H₂N-C₆H₄-SO₂C₂H₄SSO₃H | " | " |
| 6 | 5-H₂N-2-CH₃-C₆H₃-SO₂C₂H₄Cl (3-position) | " | " |
| 7 | 3-H₂N-C₆H₄-SO₂C₂H₄OSO₃H | R = CH₃ | " |
| 8 | 4-H₂N-C₆H₄-SO₂C₂H₄OSO₃H | " | " |
| 9 | 4-H₂N-2,5-(OCH₃)₂-C₆H₂-SO₂C₂H₄OCOCH₃ | " | " |
| 10 | 3-H₂N-C₆H₄-SO₂C₂H₄OSO₃H | R = C₃H₇ | " |
| 11 | 6-H₂N-naphthalene-2-SO₂C₂H₄OSO₃H | R = C₂H₅ | " |

-continued

| Example No. | Formula (III) H₂N—A—Y | Formula (V) 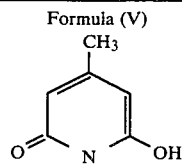 | Color on cotton |
|---|---|---|---|
| 12 | H₂N—[naphthalene with SO₃H and SO₂C₂H₄OSO₃H] | " | " |
| 13 | H₂N—[phenyl]—SO₂C₂H₄OPO₃H₂ | " | " |
| 14 | H₂N—[phenyl with OCH₃ and SO₂CH=CH₂] | [pyridinone with CH₃, OH, N—CH₃] | " |
| 15 | H₂N—[naphthalene]—SO₂C₂H₄OSO₃H | " | " |
| 16 | H₂N—[phenyl]—SO₂C₂H₄OSO₃H | [pyridinone with CH₃, OH, N—C₃H₇] | " |
| 17 | H₂N—[phenyl]—SO₂C₂H₄OSO₃H | " | " |
| 18 | H₂N—[phenyl with OCH₃ and SO₂C₂H₄OSO₃H] | [pyridinone with CH₃, OH, N—C₄H₉] | " |
| 19 | H₂N—[phenyl]—SO₂C₂H₄OSO₃H | [pyridinone with CH₃, OH, N—H] | " |
| 20 | H₂N—[naphthalene]—SO₂C₂H₄OSO₃H | " | " |

EXAMPLE 21

The pyridone compound obtained in Example 1 (0.3 part) was dissolved in water (200 parts) to prepare a dye bath. Sodium sulfate (10 parts) and then cotton (10 parts) were added thereto, and the bath was heated to 60° C. Then, sodium carbonate (4 parts) was added thereto, and the dyeing was continued for 1 hour at that temperature. Then, the cotton was rinsed with water soaped and rinsed with water to obtain a dyed product of a brilliant greenish yellow color having excellent fastness properties, particularly perspiration-light fastness and chlorine fastness. The compound gave a dyed product having an excellent level-dyeing property with good reproducibility.

EXAMPLE 22

The pyridone compound obtained in Example 2 (0.1 part) was dissolved in water (150 parts) to prepare a dye bath. Sodium sulfate (10 parts) and then cotton (10 parts) were added thereto, and the bath was heated to 50° C. Then, sodium carbonate (5 parts) was added thereto, and the dyeing was continued for 1 hour at that temperature. Then, the cotton was rinsed with water, soaped and again rinsed with water to obtain a dyed product of a brilliant greenish yellow color having excellent fastness properties, particularly perspiration-light fastness and chlorine fastness. The compound gave a dyed product having an excellent level-dyeing property with good reproducibility.

EXAMPLE 23

| Composition of printing paste | Part |
| --- | --- |
| Pyridone compound obtained in Example 1 | 3 |
| Urea | 5 |
| Thickener, sodium alginate (5%) | 50 |
| Hot water | 25 |
| Sodium hydrogencarbonate | 2 |
| Balance | 15 |

Mercerized cotton broad cloth was printed with the printing paste. The cloth printed was pre-heated and then steamed for 5 minutes at 100° C. Thereafter, the cloth was rinsed with hot water, soaped, again rinsed with hot water, and then dried to obtain a printed product of a brilliant greenish yellow color having excellent fastness properties.

EXAMPLE 24

Into a solution prepared by dissolving a nonionic surface active agent (0.1 part) in water (100 parts) was dispersed cyanuric chloride (9.2 parts) at a temperature of between 0° and 10° C. A solution of sodium 2,4-diaminobenzenesulfonate (10.5 parts) in water (100 parts) was dropwise added to the dispersion at a temperature of between 0° and 5° C. over 1 hour.

Thereafter, the reaction mixture was stirred for 1 hour at that temperature, and then adjusted to a pH of between 7 and 8. Successively, sodium nitrite (3.5 parts) was added to the reaction mixture, and concentrated hydrochloric acid (12.7 parts) was added thereto at a temperature of between 0° and 5° C. to effect diazotization. The resulting diazonium salt dispersion was added to a solution prepared by dissolving 1-ethyl-6-hydroxy-4-methyl-2-pyridone (8.8 parts) in 1N sodium hydroxide solution (50 parts), and sodium hydrogencarbonate (5 parts) was added thereto. The mixture was stirred to complete the coupling reaction.

Successively, 1-aminobenzene-3-$\beta$-sulfatoethylsulfone (14 parts) was added to the above reaction mixture. The resulting mixture was heated up to 40° C., while controlling the pH within a range of from 5 to 6, and then stirred for 5 hours at that temperature. To the reaction mixture was added sodium chloride (60 parts), and crystals precipitated were collected on a suction filter, and dried to obtain a pyridone compound of the following formula.

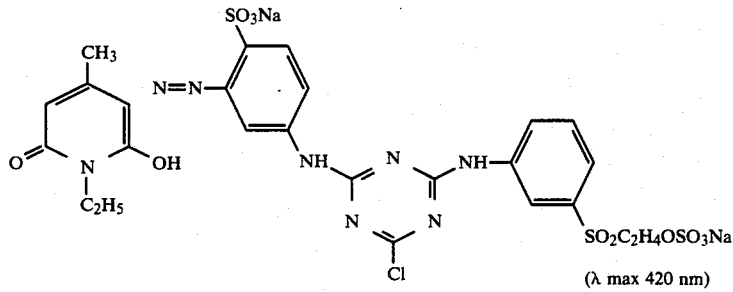

($\lambda$ max 420 nm)

EXAMPLES 25 TO 32

Example 24 was repeated, except that the 1-aminobenzene-3-$\beta$-sulfatoethylsulfone and the 1-ethyl-6-hydroxy-4-methyl-2-pyridone used in Example 24 were replaced by each compound of the formulas (III) and (V) shown in the following table, respectively, whereby each corresponding pyridone compound was obtained.

| Example No. | Formula (III) H₂N—A—Y | Formula (V) (R group) | Color on cotton |
|---|---|---|---|
| 25 | H₂N—C₆H₄—SO₂C₂H₄OSO₃H (para) | R = C₂H₅ | Greenish yellow |
| 26 | H₂N—C₆H₃(OCH₃)—SO₂C₂H₄OSO₃H | " | " |
| 27 | 2-amino-1-sulfo-6-(SO₂C₂H₄OSO₃H)-naphthalene | " | " |
| 28 | H₂N—C₆H₄—SO₂C₂H₄OSO₃H (meta) | R = CH₃ | " |
| 29 | H₂N—C₆H₄—SO₂CH=CH₂ | R = CH₃ | " |
| 30 | H₂N—C₆H₃(OCH₃)—SO₂C₂H₄OSO₃H | R = C₃H₇ | " |
| 31 | (C₂H₅)HN—C₆H₄—SO₂C₂H₄OSO₃H | R = C₂H₅ | " |
| 32 | (CH₃)HN—C₆H₄—SO₂C₂H₄OSO₃H | R = C₃H₇ | " |

EXAMPLE 33

The pyridone compound obtained in Example 24 (0.3 part) was dissolved in water (200 parts) to prepare a dye bath. Sodium sulfate (10 parts) and then cotton (10 parts) were added thereto, and the bath was heated to 60° C. Thereafter, sodium carbonate (3 parts) was added, and the dyeing was continued for 1 hour at that temperature. Then, the cotton was rinsed with water soaped and again rinsed with water to obtain a dyed product of a brilliant greenish yellow color having excellent fastness properties, particularly perspiration-light fastness and light fastness. The compound gave a dyed product having an excellent leveldyeing property with good reproducibility.

EXAMPLE 34

The pyridone compound obtained in Example 25 (0.3 part) was dissolved in water (200 parts) to obtain a dye bath. Sodium sulfate (10 parts) and then cotton (10 parts) were added thereto, and the bath was heated to 50° C. Thereafter, sodium carbonate (5 parts) was added thereto, and the dyeing was continued for 1 hour at that temperature. Then, the cotton was rinsed with water soaped and again rinsed with water to obtain a dyed product of a brilliant greenish yellow color having excellent fastness properties, particularly, perspiration-light fastness, and light fastness. The compound gave a dyed product having an excellent level-dyeing property with good reproducibility.

EXAMPLE 35

1,3-Phenylenediamine-4,6-disulfonic acid (26.8 parts) was added into water (300 parts), and dissolved using a 30% aqueous sodium hydroxide solution to adjust the pH to 6. To this solution cooled to a temperature of between 0° and 10° C. was added cyanuric chloride (18.4 parts). The mixture was stirred for 2 hours at a temperature of between 0° and 10° C., while controlling the pH within a range of from 5 to 6 using a 20% sodium carbonate. Succcessively, N-ethyl-aminobenzene-3-$\beta$-sulfatoethylsulfone (31 parts) was added to the above reaction mixture, and the mixture was stirred for 4 hours at a temperature of between 30° and 40° C., while controlling the pH within a range of from 5 to 6. To this reaction mixture was added sodium nitrite (6.9 parts), and the mixture was dropwise added over 1 hour to a 10% hydrochloric acid solution (110 parts) kept at a temperature of between 0° and 5° C. The mixture was stirred for an additional 1 hour at a temperature of between 0° and 5° C. Excess nitrous acid was decomposed with sulfamic acid. The resulting diazonium salt mixture was dropwise added to a suspension of 1-ethyl-4-methyl-6-hydroxy-2-pyridone (15.3 parts) in water (200 parts) at a temperature of between 0° and 10° C. over 1 hour, while controlling the pH within a range of from 6 to 7. The reaction mixture was stirred for an additional 1 hour at that temperature, and then mixed with potassium chloride (100 parts). Crystals precipitated were collected on a filter, and then dried to obtain a pyridone compound of the following formula.

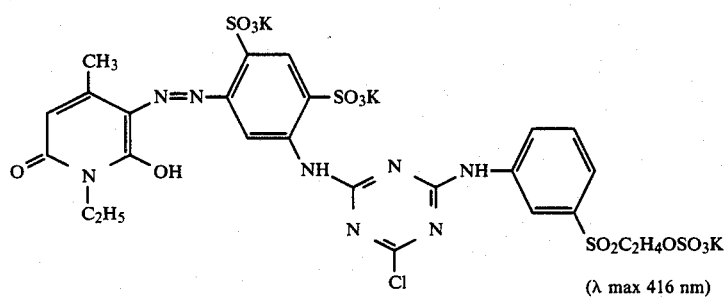

($\lambda$ max 416 nm)

EXAMPLES 36 TO 53

Example 35 was repeated, except that the N-ethyl-aminobenzene-3-$\beta$-sulfatoethylsulfone and the 1-ethyl-4-methyl-6-hydroxy-2-pyridone were replaced by each compound of the formulas (III) and (V) shown in the following table, respectively, whereby each corresponding pyridone compound was obtained.

| Example No. | Formula (III)<br>$R_2$<br>\|<br>HN—A—Y | Formula (V)<br>![structure](CH3 pyridone with R1) | Color on cotton |
|---|---|---|---|
| 36 | C2H5—N(H)—[phenyl with OCH3 and SO2C2H4OSO3H] | CH3 pyridone with N-C2H5 | Greenish yellow |

-continued

| Example No. | Formula (III)<br>R₂<br>\|<br>HN—A—Y | Formula (V)<br>(4-methyl-6-hydroxy-2-pyridone with R₁ on N) | Color on cotton |
|---|---|---|---|
| 37 | 3-(vinylsulfonyl)-N-ethylaniline: HN(C₂H₅)–C₆H₄–SO₂CH=CH₂ | " | " |
| 38 | 4-(SO₂C₂H₄SSO₃H)-N-methylaniline: HN(CH₃)–C₆H₄–SO₂C₂H₄SSO₃H | " | " |
| 39 | N-ethyl, 2-methyl, 4-(SO₂C₂H₄Cl) aniline | R₁ = C₂H₅ | " |
| 40 | 3-(SO₂C₂H₄OSO₃H)-N-ethylaniline | R₁ = CH₃ | " |
| 41 | 3-(SO₂C₂H₄OSO₃H)-N-propylaniline (C₃H₇) | " | " |
| 42 | 2,5-dimethoxy-4-(SO₂C₂H₄OCOCH₃)-N-methylaniline | " | " |
| 43 | 3-(SO₂C₂H₄OSO₃H)-N-methylaniline | R₁ = C₃H₇ | " |
| 44 | 6-(N-ethylamino)-2-(SO₂C₂H₄OSO₃H)-naphthalene | R₁ = C₂H₅ | " |

-continued
| Example No. | Formula (III) HN—A—Y with R₂ | Formula (V) with CH₃, R₁ | Color on cotton |
|---|---|---|---|
| 45 | 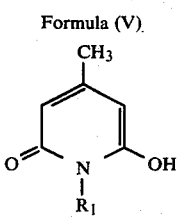 | 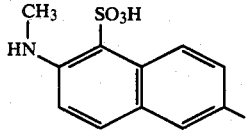 | " |
| 46 | 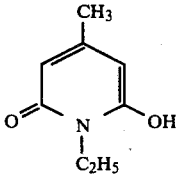 | " | " |
| 47 | 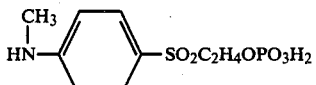 | 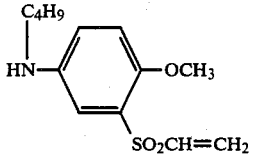 | " |
| 48 | 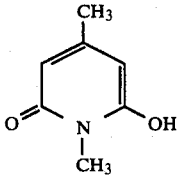 | " | " |
| 49 | 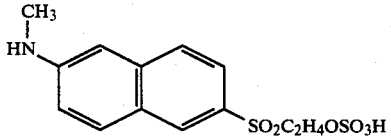 | 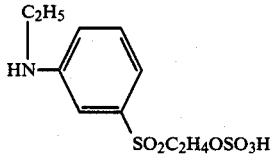 | " |
| 50 | 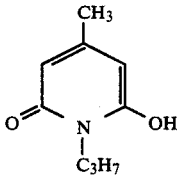 | " | " |
| 51 | 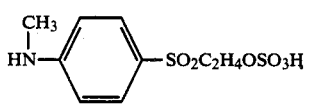 | 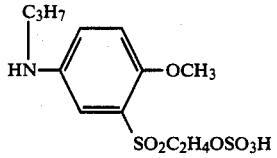 | " |
| 52 | 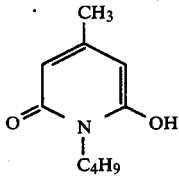 | 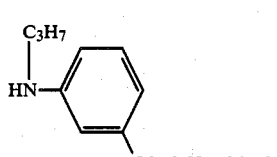 | " |

| Example No. | Formula (III) $R_2$<br>HN—A—Y | Formula (V) <br>(4-methyl-6-hydroxy-pyridone with $R_1$ on N) | Color on cotton |
|---|---|---|---|
| 53 | CH₃-HN-naphthalene-SO₂C₂H₄OSO₃H | " | " |

EXAMPLE 54

The pyridone compound obtained in Example 35 (0.3 part) was dissolved in water (250 parts) to prepare a dye bath. Sodium sulfate (10 parts) and then cotton (10 parts) were added thereinto, and the bath was heated to 60° C. Then sodium carbonate (4 parts) was added, and the dyeing was continued for 1 hour at that temperature. Then, the cotton was rinsed with water, soaped and again rinsed with water to obtain a dyed product of a brilliant greenish yellow color having excellent fastness properties, particularly perspiration-light fastness and chlorine fastness. The compound gave a dyed product of an excellent level-dyeing property with good reproducibility.

EXAMPLE 55

The pyridone compound obtained in Example 40 (0.1 part) was dissolved in water (150 parts) to prepare a dye bath. Sodium sulfate (10 parts) and then cotton (10 parts) were added thereto, and the bath was heated to 70° C. Thereafter, sodium carbonate (5 parts) was added thereto, and the dyeing was continued for 1 hour at that temperature. Then, the cotton was rinsed with water, soaped and again rinsed with water to obtain a dyed product of a brilliant greenish yellow color having excellent fastness properties, particularly, perspiration-light fastness and light fastness. The compound gave a dyed product of an excellent level-dyeing property with good reproducibility.

EXAMPLE 56

| Composition of printing paste | Part |
|---|---|
| Pyridone compound obtained in Example 35 | 3 |
| Urea | 5 |
| Thickener, sodium alginate (5%) | 50 |
| Hot water | 25 |
| Sodium hydrogencarbonate | 2 |
| Balance (water) | 15 |

Mercerized cotton broad cloth was printed with the printing paste. The cloth was pre-dried, steamed for 10 minutes at 100° C., then rinsed with hot water, soaped, again rinsed with hot water and dried to obtain a printed product of a brilliant greenish yellow color having excellent fastness properties.

What is claimed is:

1. A compound of the following formula, or a salt thereof,

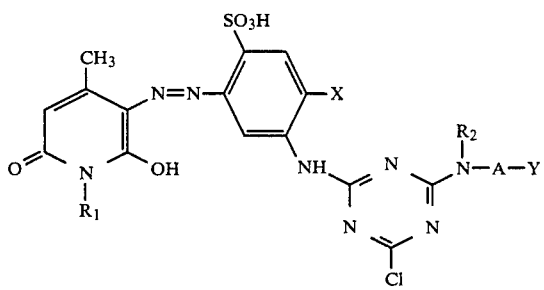

wherein $R_1$ and $R_2$ are independently hydrogen or lower alkyl having up to 4 carbon atoms, X is hydrogen, methyl or sulfo, A is phenylene unsubstituted or substituted with one or two substituents selected from the group consisting of chlorine, bromine, methyl, ethyl, methoxy, ethoxy and sulfo, or naphthylene unsubstituted or substituted with one sulfo, and Y is $-SO_2CH=CH_2$ or $-SO_2CH_2CH_2Z$, in which Z is a group capable of being split by the action of an alkali.

2. A compound according to claim 1, wherein $R_1$ is lower alkyl having up to 4 carbon atoms, and X is sulfo.

3. A compound according to claim 1, wherein $R_1$ is lower alkyl having up to 4 carbon atoms, X is sulfo and A is phenylene.

4. A compound of the following formula, or salt thereof,

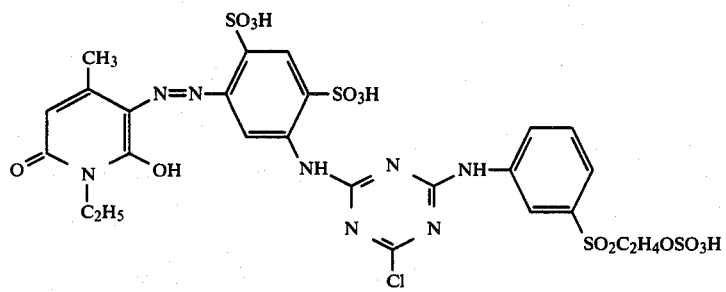
5. A compound of the following formula, or a salt thereof,
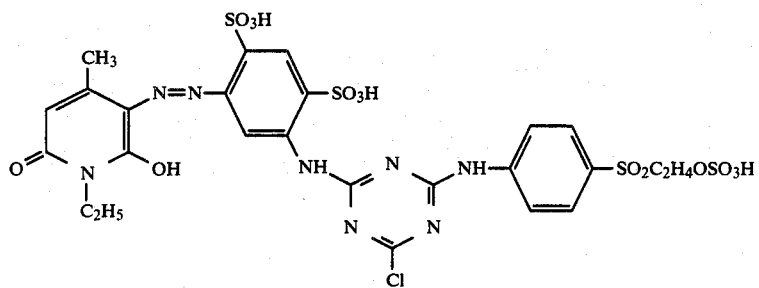
6. A compound of the following formula, or a slat thereof,
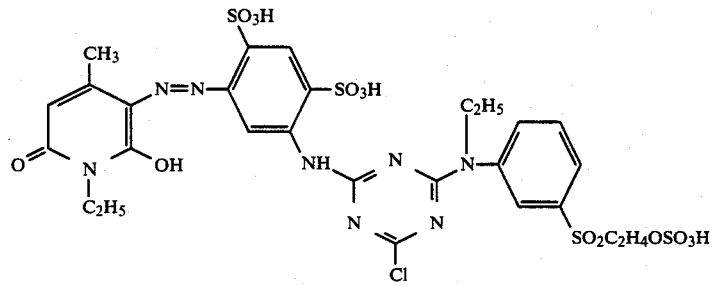
* * * * *